United States Patent [19]
Van Swam

[11] Patent Number: 6,002,735
[45] Date of Patent: Dec. 14, 1999

[54] NUCLEAR FUEL PELLET

[75] Inventor: Leonard F. P. Van Swam, Richland, Wash.

[73] Assignee: Siemens Power Corporation, Richland, Wash.

[21] Appl. No.: 08/988,201

[22] Filed: Nov. 26, 1997

Related U.S. Application Data

[60] Continuation of application No. 08/756,927, Dec. 2, 1996, abandoned, which is a division of application No. 08/594,077, Jan. 30, 1996, abandoned.

[51] Int. Cl.$^6$ ................................ G21C 3/16; G21C 3/32
[52] U.S. Cl. .............................................................. 376/435
[58] Field of Search .................................... 376/428, 435, 376/455

[56] References Cited

U.S. PATENT DOCUMENTS

| | | | |
|---|---|---|---|
| 3,042,598 | 7/1962 | Crowther | 376/435 |
| 3,081,249 | 3/1963 | Whittemore, Jr. | 376/428 |
| 3,147,191 | 9/1964 | Crowther | 376/435 |
| 3,215,607 | 11/1965 | Lackey | 376/428 |
| 3,275,525 | 9/1966 | Bloomster et al. | 376/408 |
| 3,378,453 | 4/1968 | Gorker | 376/428 |
| 3,406,090 | 10/1968 | Dunn et al. | 376/435 |
| 3,407,116 | 10/1968 | Clough | 376/428 |
| 3,421,979 | 1/1969 | Linning | 376/428 |
| 3,778,348 | 12/1973 | Sease et al. | 376/428 |
| 3,926,720 | 12/1975 | Hosegood | 376/428 |
| 4,120,752 | 10/1978 | Ocken | 176/73 |
| 4,131,511 | 12/1978 | Mordarski et al. | 376/428 |
| 4,664,882 | 5/1987 | Doshi | 376/435 |
| 4,678,629 | 7/1987 | Popa | 376/428 |
| 4,759,911 | 7/1988 | Bingham et al. | 376/428 |
| 4,994,233 | 2/1991 | Freeman | 376/428 |
| 5,349,618 | 9/1994 | Greenspan | 376/435 |

FOREIGN PATENT DOCUMENTS

| | | | |
|---|---|---|---|
| 597925 | 5/1960 | Canada | 376/428 |
| 697897 | 11/1964 | Canada | 376/428 |
| 0098696 | 1/1984 | European Pat. Off. | 376/428 |
| 0132911 | 2/1985 | European Pat. Off. | 376/455 |
| 0 332 941 | 9/1989 | European Pat. Off. . | |
| 0 514 215 | 11/1992 | European Pat. Off. . | |
| 861602 | 2/1961 | United Kingdom | 376/428 |
| 1126396 | 9/1968 | United Kingdom | 376/428 |
| 1187929 | 4/1970 | United Kingdom | 376/428 |
| 1222712 | 2/1971 | United Kingdom | 376/428 |
| 2177249 | 1/1987 | United Kingdom | 376/428 |

OTHER PUBLICATIONS

Patent Abstracts of Japan, vol. 017, No. 040 (P–1475), Jan. 27, 1993 & JP 04 256892 A.
Patent Abstracts of Japan, vol. 013, No. 351 (P–912), Aug. 7, 1989 & JP 01 110292 A.
Patent Abstracts of Japan, vol. 096, No. 002, Feb. 20, 1996 & JP 07 270568 A.
Patent Abstracts of Japan, vol. 016, No. 186 (P–1347), May 7, 1992 & JP 04 022892 A.
Nuclear Technology, vol. 39, Aug. 1978, pp. 283–288, Jensen.

*Primary Examiner*—Harvey E. Behrend
*Attorney, Agent, or Firm*—Ira Lee Zebrak

[57] ABSTRACT

A nuclear fuel pellet having concentric layers of nuclear fuel in which an outer layer has less fissionable nuclear fuel per unit volume and substantially the same amount of fertile material per unit volume as an inner core.

1 Claim, 4 Drawing Sheets

NUCLEAR FUEL PELLET

CROSS-REFERENCE TO RELATED APPLICATION

This is a continuation of Ser. No. 08/756,927 filed Dec. 2, 1996 now abandoned, which is a divisional of application Ser. No. 08/594,077 filed Jan. 30, 1996 entitled Nuclear Fuel Pellet now abandoned.

FIELD OF THE INVENTION

The present invention relates generally to nuclear fuel assemblies for nuclear reactors, and more particularly to nuclear fuel pellets for use in nuclear fuel rods within a nuclear fuel assembly.

BACKGROUND OF THE INVENTION

The current emphasis on the improvement of the economics and the competitive position of commercial nuclear power presents a strong incentive for efforts to reduce reactor fuel costs. A principal means for accomplishing such a reduction is through an increase in the design power output and fission burnup of the nuclear fuel.

Nuclear fuel rods for water reactors generally include a tube or container within which is nuclear fuel in the form of fuel pellets which may have various shapes such as spheres, small particles or cylinders and which comprise fissionable and/or fertile material. Various nuclear fuels may be used, including uranium compounds, thorium compounds, plutonium compounds, and mixtures thereof. Nuclear fuel pellets currently being used in water reactors in the United States are typically circular cylinders comprised of sintered uranium dioxide ($UO_2$) which has been enriched in Uranium$^{235}$ ($U^{235}$) up to approximately 5 weight percent (w/o). Outside of the United States, the nuclear fuel in the nuclear fuel pellets can be a mixed oxide in which, for example, plutonium (which is obtained from the reprocessing of spent nuclear fuel) is combined with natural or depleted uranium to form a mixed oxide of plutonium and uranium [(Pu—U)$O_2$] containing up to about 5% fissionable plutonium and which can be used in power reactors otherwise using slightly enriched uranium.

During the course of reactor operations, the nuclear fuel pellet and more particularly an outer layer called the rim which is formed as a result of high values of burnup reached in the pellet periphery, undergoes significant structural change. At high burnup, the rim becomes highly porous and the grains of the fuel fracture into subgrains of 0.5 to 1.0 microns in size compared to a grain structure when initially manufactured of typically 10 microns or larger. The rim structure is mechanically weak, prone to gas release, and has low thermal conductivity due to the high porosity. Although the thickness of the rim depends upon how the rim is defined as well as the local burnup in the rim which in turn depends on the initial enrichment of the fuel pellet, at burnups of 50 GWd/tHM (gigawatt-days per metric ton of heavy metal: thorium, uranium, or plutonium), the thickness of the rim is typically approximately 50 microns (2 mils) and at 60 GWd/tHM the thickness may reach up to 100 microns (4 mils). At an average pellet burnup of 70 GWd/tHM, the thickness may be 200 microns (8 mils).

The formation of the rim structure can significantly impair the ability to achieve high fuel burnup. The rim becomes highly porous, mechanically very weak which increases the possibility of fracture, and concomitantly increases the probability of athermal fission product gas release and decreases the local thermal conductivity which leads to an increase in fuel rod centerline temperature.

The development or formation of the characteristic rim structure is the result of very high burnup values reached in the pellet rim. More particularly, during operation of reactors loaded with uranium dioxide fuel enriched in $U^{235}$, neutrons and particularly epithermal neutrons which are produced from fissioning of $U^{235}$ in fuel pellets, penetrate a small distance into a thin outer layer of the fuel pellet where they are available for capture by Uranium$^{238}$ ($U^{238}$) due to resonance peaks to form Plutonium$^{239}$ and other plutonium isotopes. The high burnup in the pellet rim is the result of the fissioning of $U^{235}$ plus the additional fissioning of fissile plutonium, which as stated above is bred from $U^{238}$ in the rim mainly by the capture of epithermal neutrons.

Since the formation of the mechanically weak porous rim structure can significantly impair the ability to achieve high burnup (e.g. above 55–60 GWd/tU pellet average in uranium fuel, where 1 GWd/tU=1 giga-watt day per metric ton of uranium=1 GWd/tHM) and increased power output, it would be an advantage to have a fuel pellet in which the formation of the rim structure is prevented, or at least reduced or delayed.

SUMMARY OF THE INVENTION

A fuel pellet for a nuclear fuel rod within a nuclear reactor fuel assembly comprising an inner cylindrical core of nuclear fuel including at least one of a fissionable material and a fertile material and an outer cylindrical layer of nuclear fuel having less fissionable nuclear material per unit volume and substantially the same amount of fertile material per unit volume as the inner cylindrical core.

DETAILED DESCRIPTION OF THE INVENTION

Figure 1:
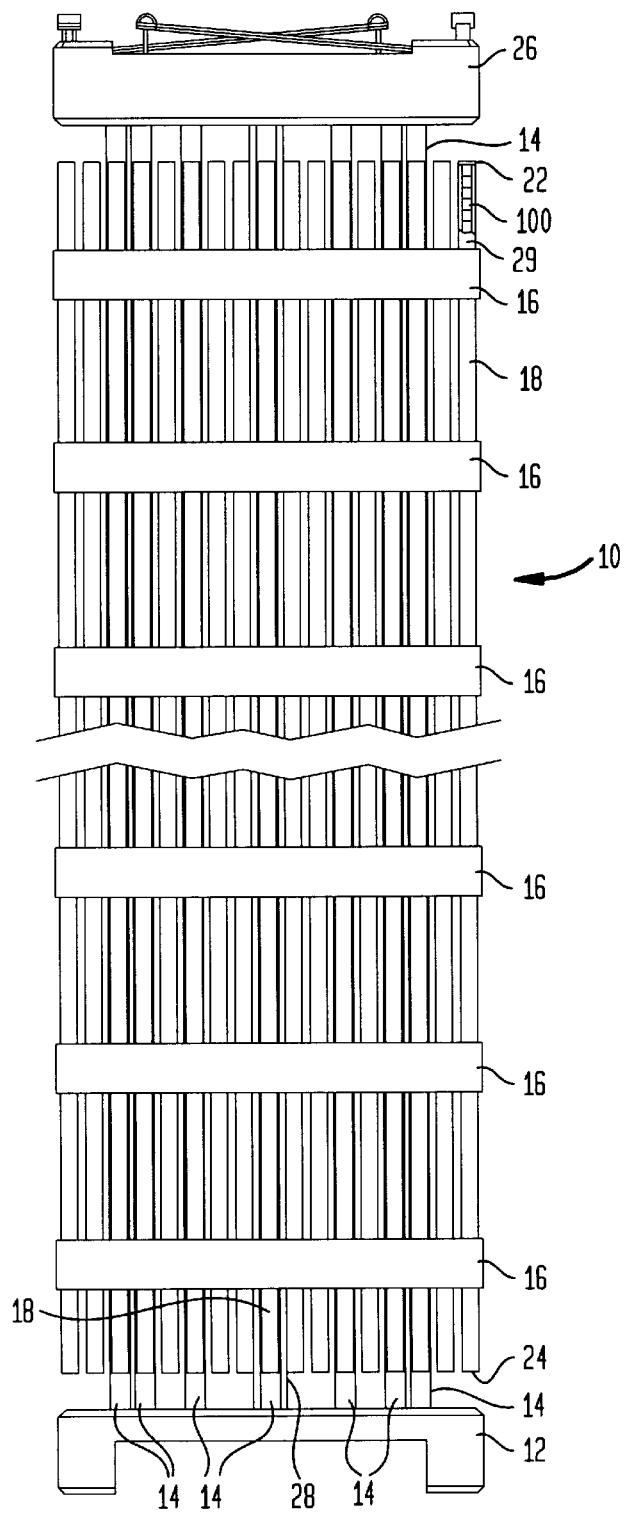
FIG. 1 is a side elevational view of a nuclear fuel assembly for a pressurized water reactor, the assembly being foreshortened in height.

FIG. 1 represents a pressurized water reactor (PWR) nuclear fuel assembly 10 comprising a lower tie plate 12, guide tubes 14, nuclear fuel rods 18 which are spaced radially and supported by spacer grids 16 spaced along the guide tubes, an instrumentation tube 28, and an upper tie plate 26 attached to the upper ends of the guide tubes. Each fuel rod 18 generally includes a metallic tubular fuel rod cladding 29 within which are nuclear fuel pellets 100 composed of fissionable and/or fertile material and an upper end plug 22 and a lower end plug 24 which hermetically seal the nuclear fuel pellets within the metallic tubular fuel rod cladding. Control rods which are used to assist in controlling the fission reaction are disposed in the guide tubes, but are not shown in this view.

Figure 2:
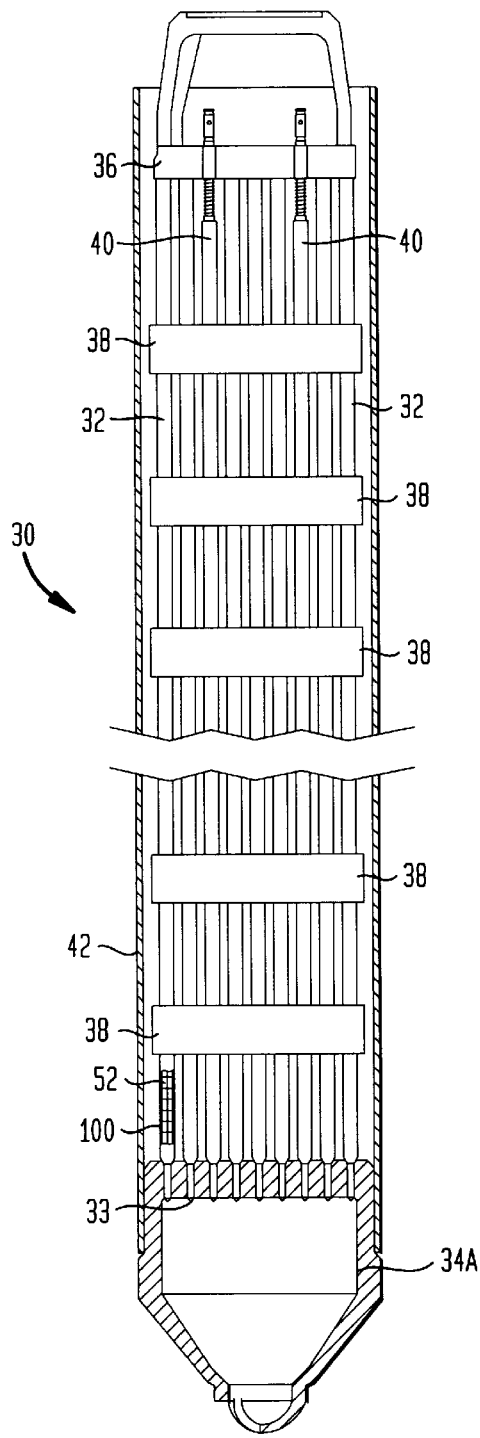
FIG. 2 is a side elevational view of a nuclear fuel assembly for a boiling water reactor, the assembly being foreshortened in height.

Referring to FIG. 2, an example of a boiling water reactor (BWR) fuel assembly typically used in reactors in the U.S. is generally shown at 30 having nuclear fuel rods 32 which are supported between a lower tie plate 34A and upper tie plate 36. Each fuel rod generally includes a metallic tubular fuel rod cladding 52 within which are nuclear fuel pellets 100 which are hermetically sealed within the tubular cladding by end sealing means such as end plugs. Lower tie plate 34A and upper tie plate 36 are connected structurally by tie rods 40 positioned within the array of fuel rods or by other means such as an inner water channel. Spacer grids 38 provide intermediate support of the fuel rods 32 over the length of the fuel assembly and maintain them in a spaced relationship while restraining them from lateral vibration. Outer channel 42 surrounds the fuel assembly and extends from the lower tie plate to the upper tie plate. An example of a boiling water reactor fuel assembly used in reactors outside the U.S. and typically in Europe is generally shown at 30 in FIG. 3 and similarly has tie rods 40, spacer grids 38, outer channel 42, and fuel rods 32 each generally including a metallic tubular fuel cladding 52 within which are nuclear fuel pellets 100. The fuel rods 32 are supported between a lower tie plate 34B and upper tie plate 36.

Figure 3:
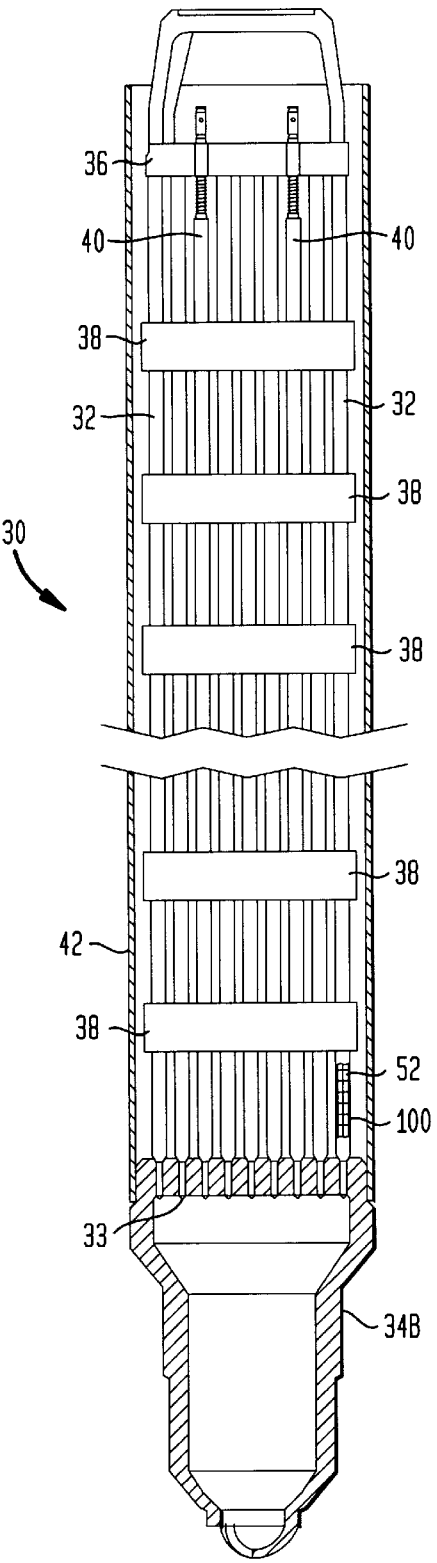
FIG. 3 is a side elevational view of another assembly for a boiling water reactor, the assembly being foreshortened in height.
Figure 4:
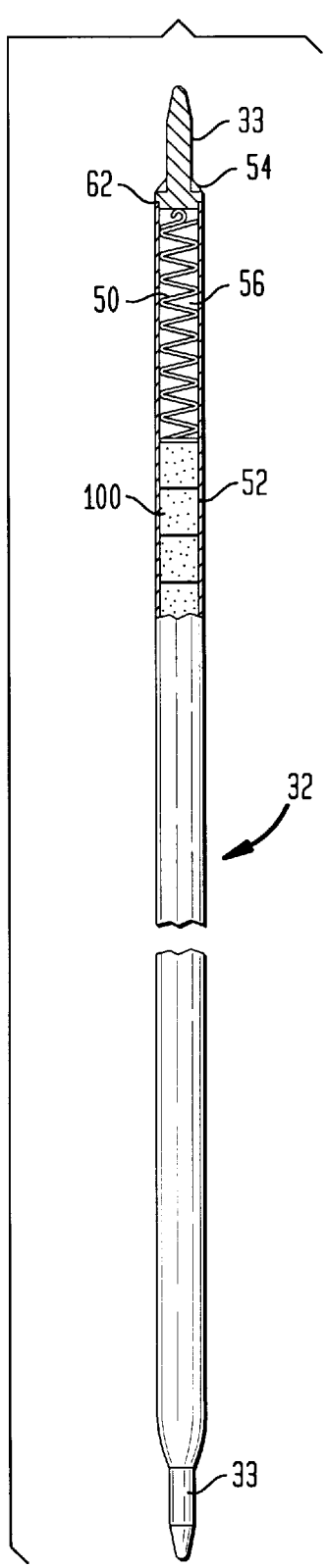
FIG. 4 shows a partial longitudinal sectional view of a nuclear fuel rod containing nuclear fuel with a portion of the outer tube or cladding being cut away.

Referring to FIG. 4, nuclear fuel rod 32 shown in FIGS. 2 and 3 includes nuclear fuel shown as a plurality of fuel pellets 100 of fissionable and/or fertile material positioned within a metallic tubular fuel rod cladding 52. The metallic tubular fuel rod cladding is sealed at its ends by means of end plugs 54 which may include alignment pins 33 to facilitate the mounting of the fuel rod in the assembly. A void space or plenum 56 is provided at one end of the fuel rod to permit longitudinal expansion of the nuclear fuel and accumulation of gases released from the nuclear fuel. A helical spring member 58 is positioned within space 56 and is capable of maintaining the position of the fuel pellets during handling and transportation of the fuel rods. Cladding 52 is secured to end plugs 54 by means of circumferential welds 62.

Figure 5:
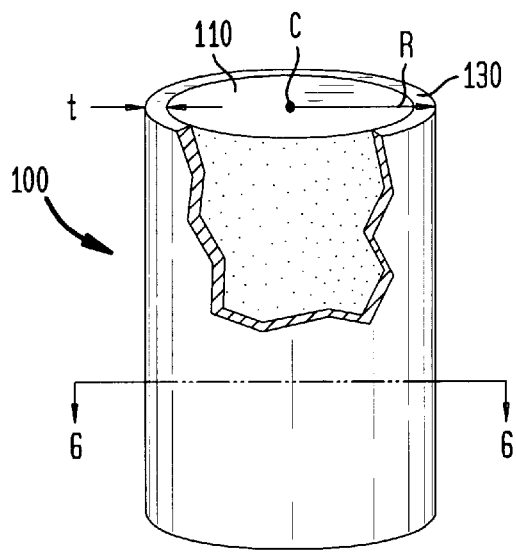
FIG. 5 is a perspective view of a fuel pellet in accordance with the present invention.
Figure 6:
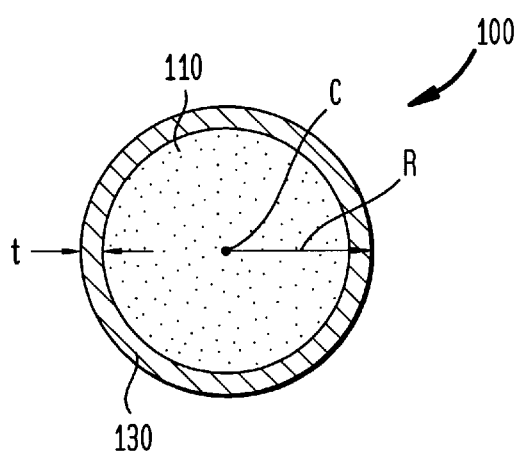
FIG. 6 is a sectional view of the fuel pellet shown in FIG. 5 taken along line 6—6.

Referring to FIGS. 5 and 6, fuel pellet 100 for use in a fuel rod within a nuclear reactor fuel assembly such as in FIGS. 1–3 is shown in accordance with the present invention having an outer cylindrical layer 130 and an inner cylindrical core 110 of nuclear fuel in which outer layer 130 has less fissionable nuclear fuel per unit volume, and substantially the same amount of fertile material per unit volume, as inner cylindrical core 110. Two of the variables which affect fuel burnup of the pellet periphery are (a) the concentration of fissionable materials (e.g. $U^{235}$) which can be selected to be between depleted urania and the enrichment of the inner core, and (b) the thickness t of outer cylindrical layer. Although various nuclear fuels including for example uranium compounds, plutonium compounds, thorium compounds and mixtures thereof can be used, in preferred embodiments of the present invention outer cylindrical layer 130 is comprised of low enriched, natural or depleted urania having a thickness of from about 1 to 25 mils but preferably from about 3 to 8 mils, particularly 4 to 5 mils, and inner cylindrical core 110 which is enriched uranium dioxide.

The burnup in the lower enriched outer cylindrical layer 130 will be lower than in standard fuel pellets because there is less $U^{235}$ in the outer layer. The plutonium production profile (from the pellet outer radius R to pellet central axis C) for a pellet with low enriched, natural or depleted urania outer layer 130 will be substantially the same as it would be for a standard prior art pellet. The plutonium production is high in a thin outer shell of the pellet mainly due to epithermal neutrons that penetrate only a small distance and diminishes rapidly toward the center of the pellet due to self-shielding. The burnup in the rim of the standard pellet becomes very high due to the contribution of fissioning of both $U^{235}$ and plutonium isotopes.

During reactor operations, epithermal neutrons will mostly be captured in outer cylindrical layer 130 which is comprised of low enriched, natural or depleted urania and accordingly breeding and fissioning of plutonium in the pellet rim will take place as it does in the standard pellet. However, since there is little or no $U^{235}$ in outer layer 130 to contribute to the burnup, the burnup in outer layer 130 will be reduced by approximately 9.6 GWd/tU per 1 weight percent reduction of $U^{235}$ in outer layer 130 with respect to the $U^{235}$ content in inner core 110. Thus, in accordance with the present invention, rim formation can be delayed significantly to the point where essentially rim restructuring will not take place when the pellet average burnup is increased above 60 GWd/tU to 90 (or higher) GWd/tU.

By lowering the amount of $U^{235}$ in the outer layer 130 of the pellet, the required amount of $U^{235}$ enrichment for the inner core 110 must be increased by a small amount in order to obtain a pellet with the same reactivity as a pellet of uniform composition. For example, a 0.35 inch diameter pellet with a 5 mil outer layer 130 of natural uranium would compare to a standard pellet of diameter 0.35 inch having a uniform 4 w/o $U^{235}$ enrichment throughout the pellet as follows. For every 100 kilograms of 4 w/o $U^{235}$ enrichment for use in standard prior art pellets, approximately 94.5 kilograms of 4.20 w/o $U^{235}$ enrichment and 5.5 kilograms of natural urania would be required. Although there is a cost differential due to the increase in the enrichment of $U^{235}$ from 4 w/o to 4.20 w/o, and the additional fabrication step of producing the outer layer on the 4.20 w/o enriched $U^{235}$ inner core such as, for example, by copressing, coextrusion, spray coating, or dipping in a slurry, the ability to irradiate the fuel to a higher burnup results in a significant cost savings due to reduced reactor fuel cycle costs.

Figure 7:
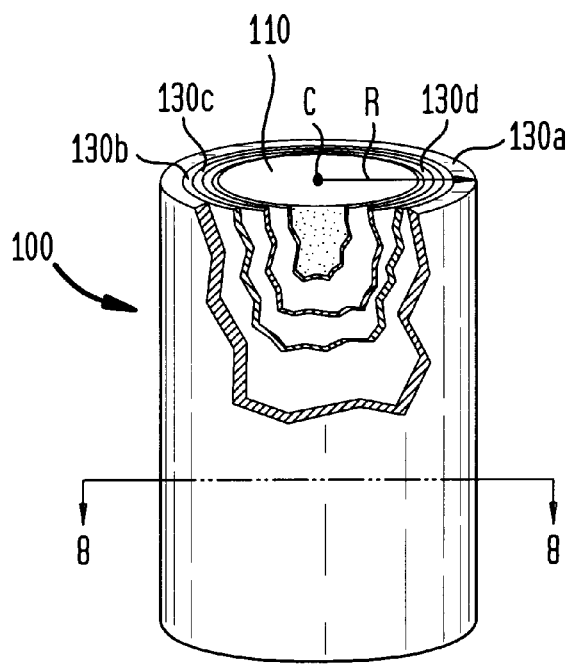
FIG. 7 is a perspective view of a fuel pellet in accordance with an alternative embodiment of the present invention.
Figure 8:
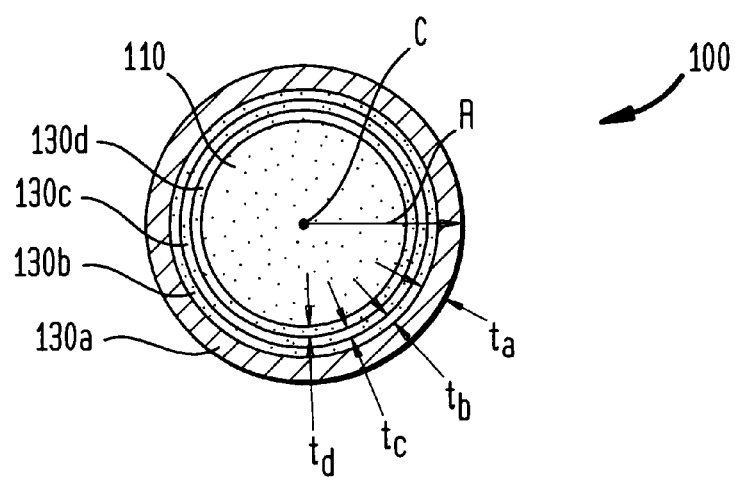
FIG. 8 is a sectional view of the fuel pellet shown in FIG. 7 taken along line 8—8.

In the embodiment in FIGS. 5 and 6, pellet 100 is shown comprising a single outer cylindrical layer 130 of lower $U^{235}$ enrichment than inner core 110. In an alternative embodiment shown in FIGS. 7 and 8, pellet 100 is comprised of an inner cylindrical core 110 and a plurality of outer cylindrical layers shown as 130a, 130b, 130c and 130d having thicknesses $t_a$, $t_b$, $t_c$, and $t_d$ wherein the $U^{235}$ concentration decreases in each of the outer cylindrical layers from the central axis C towards the outer radius R of the pellet. In another embodiment of the invention, pellet 100 is comprised of an inner cylindrical core 110 and a great number of outer layers where the $U^{235}$ gradually diminishes in the outer layers virtually continuously from the central axis C towards the pellet outer radius R so that the $U^{235}$ concentration profile from the center of the pellet to the periphery of the pellet would be the inverse of the plutonium profile being bred within the pellet. Such a pellet with a $U^{235}$ concentration profile which is the inverse of the plutonium production profile, would at a predetermined burnup, produce a completely flat burnup profile and eliminate the formation of the rim.

While the foregoing description and drawings represent the preferred embodiments of the present invention, it will be apparent to those skilled in the art that various changes and modifications may be made therein without departing from the true spirit and scope of the present invention.

What is claimed:

1. A nuclear fuel assembly for a boiling water reactor, the assembly having a plurality of nuclear fuel rods supported between a lower tie plate positioned toward the bottom of the assembly and an upper tie plate positioned toward the top of the assembly, an outer channel surrounding the plurality of nuclear fuel rods for conducting coolant/moderator about the fuel rods from the bottom of the assembly toward the top of the assembly, spacer grids for positioning and retaining the fuel rods in a spaced relationship, at least one of the plurality of nuclear fuel rods comprising a metallic tubular fuel rod cladding containing nuclear fuel pellets therein, and having end sealing means thereon to hermetically seal the nuclear fuel pellets within the metallic tubular fuel rod cladding, wherein at least one of the nuclear fuel pellets is comprised of:

a) a solid inner cylindrical core having a central axis and comprised of nuclear fuel including a fissionable material and a fertile material; and b) a plurality of concentric continuous outer cylindrical layers of nuclear material having an outer radius wherein each of the concentric outer cylindrical layers is comprised of a fissionable material and a fertile material wherein the concentration of fissionable material in each of the plurality of outer concentric cylindrical layers decreases from the central axis of the inner cylindrical core towards the outer radius.

* * * * *